United States Patent
Darr et al.

(10) Patent No.: US 10,371,561 B2
(45) Date of Patent: Aug. 6, 2019

(54) YIELD MEASUREMENT AND BASE CUTTER HEIGHT CONTROL SYSTEMS FOR A HARVESTER

(71) Applicants: IOWA STATE UNIVERSITY RESEARCH FOUNDATION, INC., Ames, IA (US); DEERE & COMPANY, Moline, IL (US); CARNEGIE MELLON UNIVERSITY, Pittsburgh, PA (US)

(72) Inventors: Matthew J. Darr, Ames, IA (US); Daniel Joseph Corbett, Thibodaux, LA (US); Herman Herman, Gibsonia, PA (US); Carlos Vallespi-Gonzalez, Pittsburgh, PA (US); Bryan E. Dugas, Napoleonville, LA (US); Hernan Badino, Pittsburgh, PA (US)

(73) Assignees: Iowa State University Research Foundation, Inc., Ames, IA (US); Deere & Company, Moline, IL (US); Carnegie Mellon University, Pittsburgh, PA (US)

( * ) Notice: Subject to any disclaimer, the term of this patent is extended or adjusted under 35 U.S.C. 154(b) by 685 days.

(21) Appl. No.: 14/527,152

(22) Filed: Oct. 29, 2014

(65) Prior Publication Data

US 2015/0124054 A1 May 7, 2015

Related U.S. Application Data

(60) Provisional application No. 61/898,600, filed on Nov. 1, 2013.

(51) Int. Cl.
*G01F 25/00* (2006.01)
*G01F 22/00* (2006.01)

(52) U.S. Cl.
CPC .......... *G01F 25/0084* (2013.01); *G01F 22/00* (2013.01)

(58) Field of Classification Search
CPC ............................. G01F 25/0084; G01F 22/00
See application file for complete search history.

(56) References Cited

U.S. PATENT DOCUMENTS 6,389,785 B1 * 5/2002 Diekhans ............. A01B 69/001
172/4.5
8,988,426 B2 * 3/2015 Chen ....................... G06T 17/05
345/419

(Continued)

FOREIGN PATENT DOCUMENTS

CN 1695419 A 11/2005
CN 102379189 A 3/2012

OTHER PUBLICATIONS

Office Action issued in Chinese Application No. 201410602449.5 dated Sep. 22, 2017 along with an English translation.

(Continued)

*Primary Examiner* — Jelani A Smith
*Assistant Examiner* — Mathew Franklin Gordon
(74) *Attorney, Agent, or Firm* — Kilpatrick Townsend & Stockton LLP

(57) ABSTRACT

A system is provided that can include a 3D sensor. The 3D sensor can be configured to detect an area of an elevator on a harvester. The 3D sensor can further be configured to transmit a first signal associated with the area. The system can also include a processing device in communication with the 3D sensor. The system can further include a memory device in which instructions executable by the processing device are stored for causing the processing device to receive the first signal and determine a volume of a material on the elevator based on the first signal.

37 Claims, 13 Drawing Sheets

(56) References Cited

U.S. PATENT DOCUMENTS

| | | | |
|---|---|---|---|
| 9,348,111 B2* | 5/2016 | Cohen | G06T 5/006 |
| 2002/0014116 A1* | 2/2002 | Campbell | A01D 33/00 |
| | | | 73/149 |
| 2003/0184747 A1* | 10/2003 | Diekhans | A01D 41/141 |
| | | | 342/123 |
| 2004/0031335 A1* | 2/2004 | Fromme | G01L 311/24 |
| | | | 73/865 |
| 2005/0027482 A1 | 2/2005 | Benaoudia et al. | |
| 2006/0026939 A1* | 2/2006 | Kormann | A01D 41/141 |
| | | | 56/10.2 E |
| 2007/0262000 A1* | 11/2007 | Valerio | B07C 5/344 |
| | | | 209/556 |
| 2008/0156124 A1* | 7/2008 | O'Connor | B01F 5/241 |
| | | | 73/866 |
| 2009/0036184 A1* | 2/2009 | Craessaerts | A01F 12/448 |
| | | | 460/1 |
| 2010/0269470 A1* | 10/2010 | Price | A01D 45/10 |
| | | | 56/10.2 H |
| 2011/0166788 A1* | 7/2011 | Griffin | G06Q 10/04 |
| | | | 702/5 |
| 2012/0004815 A1* | 1/2012 | Behnke | A01D 41/1277 |
| | | | 701/50 |
| 2012/0301032 A1* | 11/2012 | Kawanishi | G06F 17/30247 |
| | | | 382/190 |
| 2013/0211675 A1* | 8/2013 | Bonefas | B62D 12/02 |
| | | | 701/41 |
| 2015/0022638 A1* | 1/2015 | Saeki | G06T 7/0004 |
| | | | 348/46 |

OTHER PUBLICATIONS

Office Action issued for Chinese Application No. 201410602449.5 dated Jun. 19, 2018 along with an English translation (16 pages).

* cited by examiner

YIELD MEASUREMENT AND BASE CUTTER HEIGHT CONTROL SYSTEMS FOR A HARVESTER

REFERENCE TO RELATED APPLICATION

This claims priority to U.S. Provisional Patent Application No. 61/898,600, titled "Video-Based Yield Measurement and Base Cutter Height Control for Harvester" and filed Nov. 1, 2013, the entirety of which is hereby incorporated by reference herein.

TECHNICAL FIELD

The present disclosure relates generally to devices for use in farming operations. More specifically, but not by way of limitation, this disclosure relates to yield measurement and base cutter height control systems for a harvester.

BACKGROUND

A harvester or combine can be used for gathering material (e.g., sugar cane, vegetables, crops, etc.) from a farm and loading the material into a cart pulled by a tractor. As with many other kinds of farming operations, it can be desirable for a farm operator to know the yield of each section of the farm. This can allow the farm operator to optimize the farming process. Information about the yield can be difficult to obtain.

SUMMARY

In one example, a system is provided that can include a 3D sensor. The 3D sensor can be configured to detect an area of an elevator on a harvester. The 3D sensor can further be configured to transmit a first signal associated with the area. The system can also include a processing device in communication with the camera system. The system can further include a memory device in which instructions executable by the processing device are stored for causing the processing device to receive the first signal and determine a volume of a material on the elevator based on the first signal.

In another example, a method is provided that can include receiving, by a processing device, a data signal from a 3D sensor. The 3D sensor can be positioned on an elevator of a harvester. The method can also include generating, by the processing device, a three-dimensional (3D) map based on the data signal. The method can further include determining, by the processing device, a volume of a material on the elevator based on the 3D map.

In another example, a harvester is provided. The harvester can include an elevator. A 3D sensor can be coupled to the harvester. The 3D sensor can be configured to detect an area associated with the elevator. The 3D sensor can further be configured to transmit a data signal associated with the area for generating a 3D map associated with a material on the elevator, determining a composition of the material, and determining a volume of a crop included in the material based on the composition and the 3D map.

In another example, a system is provided that can include a 3D sensor configured to detect an area associated with a ground under a harvester. The 3D sensor can also be configured to transmit a first signal associated with the area. The system can also include a processing device in communication with the 3D sensor. The system can further include a memory device in which instructions executable by the processing device are stored for causing the processing device to determine a parameter of a base cutter based on the first signal.

In another example, a method is provided that can include receiving, by a processing device, a data signal from a 3D sensor positioned on a harvester. The method can also include generating, by the processing device, a three-dimensional (3D) map based on the data signal. The method can further include determining, by the processing device, a lateral position of a row of material or a height of the row of material based on the 3D map.

DETAILED DESCRIPTION

Yield Measurement System

Figure 1:
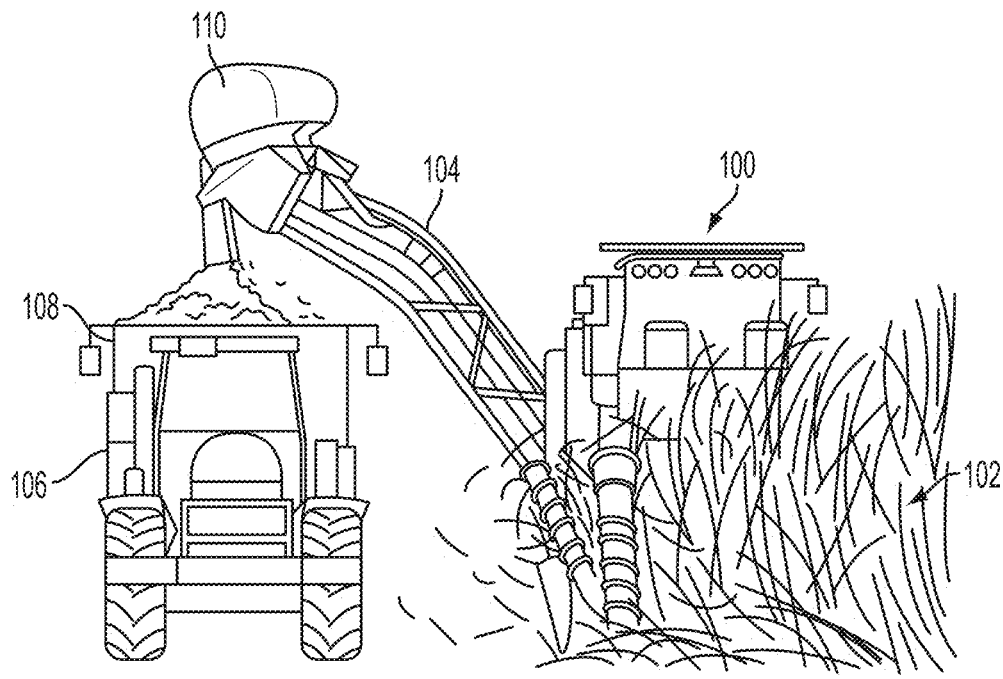
FIG. 1 is a front perspective view of an example of a harvester for use with a yield measurement system and a base-cutter height control system according to one example.

Certain aspects and features of the present disclosure are directed to a real-time, yield measurement system for a harvester (e.g., a combine). The yield measurement system can include a 3D sensor (e.g., a stereo camera system) coupled to an elevator of the harvester. The 3D sensor can detect a material (e.g., sugar cane, potatoes, beets, tomatoes, or other crops) passing over a portion of the elevator. The yield measurement system can process data from the 3D sensor to measure the net volume of material carried by the elevator in real-time (e.g., substantially simultaneously with harvesting).

In some examples, the yield measurement system can distinguish between crops and trash (e.g., extraneous material) carried by the elevator. The yield measurement system can distinguish between crops and trash by determining one or more characteristics (e.g., sizes, colors, shapes, and textures) of the material carried by the elevator. The yield measurement system can determine the composition of the material (e.g., how much of the material is the crop and how much of the material is trash) based on the characteristics. For example, the 3D sensor can include two or more cameras. The yield measurement system can analyze captured images of the portion of the elevator viewable by the cameras. The captured images can capture the surface area of the material on the elevator. Based on the captured images, the yield measurement system can estimate that 80% of the surface area of the material includes sugar cane and 20% of the surface area of the material includes trash. Based on the ratio of crop to trash, the yield measurement system can apply a scaling factor to the net volume measurement to estimate the volume of the material associated with the crop. For example, the yield measurement system can multiply the net volume measurement by 80% (i.e., 0.8) to determine the actual volume of the material that is associated with the sugar cane. In this manner, the yield measurement system can determine (e.g., estimate) from the captured images the volume of the crop on the portion of elevator viewable by the cameras.

In some examples, the yield measurement system can measure the volume of material in overlapping sections of the elevator. The measurement system can adjust the volume measurement based on the amount of overlap. This can allow the yield measurement system to provide more accurate volume measurements.

In some examples, the yield measurement system can include sensors for detecting parameters associated with the harvester. The parameters can include the ground speed, Global Positioning System (GPS) location, primary extractor speed, secondary extractor speed, primary fan speed, secondary fan speed, engine rpm, a parameter associated with a topper, direction, crop processing engagement, and operational status of the harvester. The yield measurement system can integrate the volume measurement with the harvester parameters to generate a yield map in real-time.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a front perspective view of an example of a harvester 100 for use with a yield measurement system and a base-cutter height control system according to one example. The harvester 100 can be used to gather a material 102 (e.g., the sugar cane 506 shown in FIG. 5) from a field. The harvester 100 can be any harvester 100 for gathering any type of crop. The material 102 can pass through the harvester 100 into an elevator 104. The material 102 can be carried up the elevator 104 and loaded (e.g., dumped) into a cart 108 pulled by a tractor 106.

Figure 2:
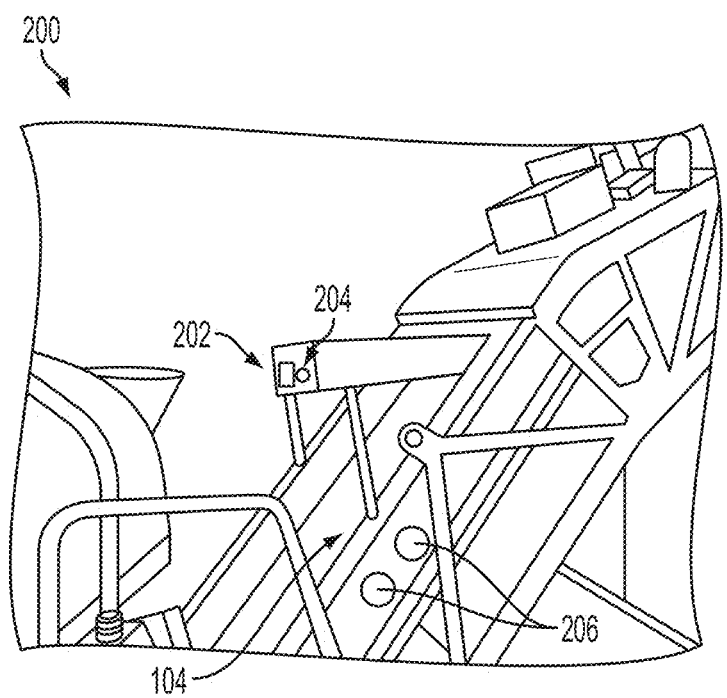
FIG. 2 is a perspective view of a yield measurement system mounted on an elevator of a harvester according to one example.

FIG. 2 is a perspective view of a yield measurement system 200 mounted on an elevator 104 of a harvester machine according to one example. The yield measurement system 200 can include a 3D sensor 202 for capturing the three-dimensional (3D) profile of material in the elevator 104. The 3D sensor can include one or more of a camera, a 3D laser scanner, an ultrasonic transducer, a range sensor, a structured light camera, a 3D camera, and a flash LIDAR.

Figure 3:
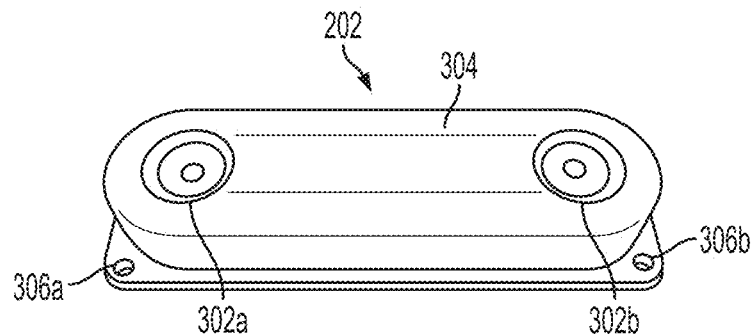
FIG. 3 is a perspective view of a camera system for use with a yield measurement system according to one example.

In some examples, the 3D sensor 202 can include two or more cameras (e.g., color cameras or grayscale cameras) mounted in the same housing or in different housings. The cameras can have a known geometric or spatial relationship with respect to one another. For example, as shown in FIG. 3, the 3D sensor 202 can include stereo cameras 302a, 302b mounted in a housing 304. The housing 304 can include one or more mounting devices 306a, 306b (e.g., holes, clips, or clamps) for mounting the 3D sensor 202 to the harvester. The housing 304 can include holes positioned in front of the stereo cameras 302a, 302b such that the housing 304 does not block the field of view of the stereo cameras 302a, 302b. The stereo cameras 302a, 302b can have a known spatial relationship with respect to one another.

The 3D sensor 202 can be mounted above the elevator 104 and oriented facing the elevator 104. This can allow the 3D sensor 202 to detect material carried by the elevator 104 and passing through the detectable area of the 3D sensor 202 (e.g., the field of view of cameras associated with the 3D sensor 202). The 3D sensor 202 can transmit signals associated with the detectable area to a computing device (e.g., computing device 612 of FIG. 6).

The computing device (not shown) can be positioned in any suitable location within the harvester. For example, the computing device can be positioned within the passenger cabin of the harvester. The computing device can receive the signals from the 3D sensor 202 and apply data associated with the signals to one or more algorithms (e.g., image processing algorithms or stereovision algorithms). The computing device can use the algorithms to generate a 3D profile of the scene detected by the 3D sensor 202 (e.g., the portion of the elevator 104 and the material within the portion of the elevator 104). In examples in which the 3D sensor 202 includes cameras, as the number of cameras making up the 3D sensor 202 increases, the computing device may be able to generate a more detailed or accurate 3D profile of the scene.

Figure 8:
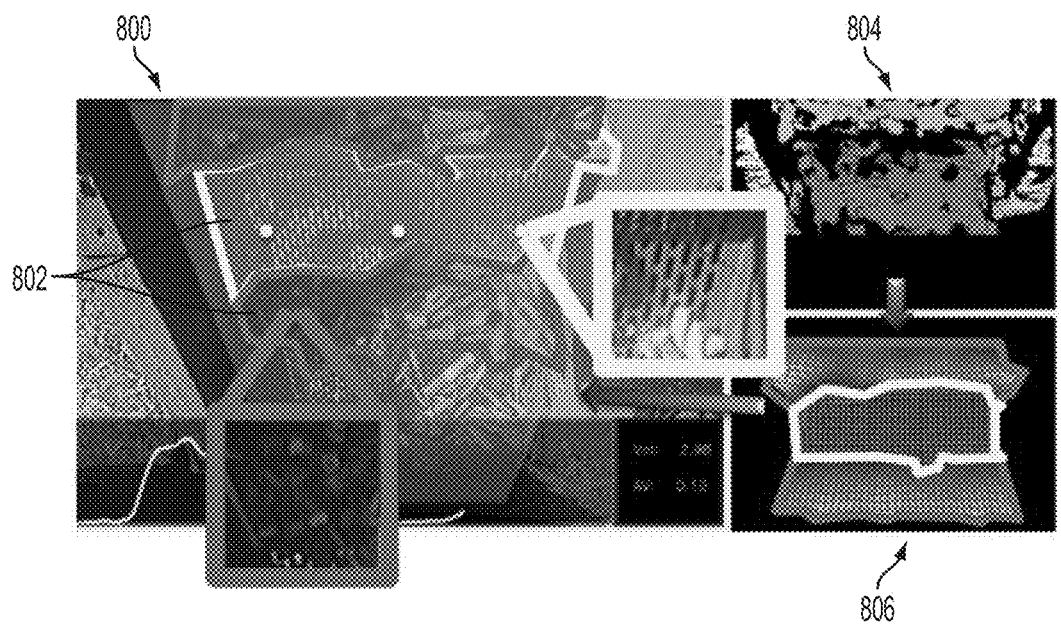
FIG. 8 is a segmented image for use in determining the composition of the material in the image according to one example.

As depicted in FIG. 8, in examples in which the 3D sensor 202 includes cameras, the computing device can generate a 3D profile of the scene based on captured images from the cameras. For example, the computing device can apply triangulation to the captured images. Triangulation can include matching a pixel from a first image taken by a first camera to an associated pixel in a second image taken by a second camera. The difference between the pixel location in the first image and the corresponding pixel location in the second image can be the disparity. The computing device can generate an image 804 depicting the disparities between pixels in the captured images. Based on each pixel location in the first image, the associated disparity, and a distance in real space (e.g., in meters) between the first camera and the second camera, the computing device can determine a 3D location in real space associated with each pixel. The computing device can use the 3D locations in real space to generate a 3D profile 806 corresponding to the camera data.

In some examples, the computing device can use data from a camera in the 3D sensor to determine a characteristic of the material. For example, the computing device can determine one or more characteristic associated with the material (e.g., color and texture) and one or more characteristics associated with the elevator. In some examples, the computing device can determine that the material is a color (e.g., brown) and that the elevator is a different color (e.g., silver).

Figure 9:
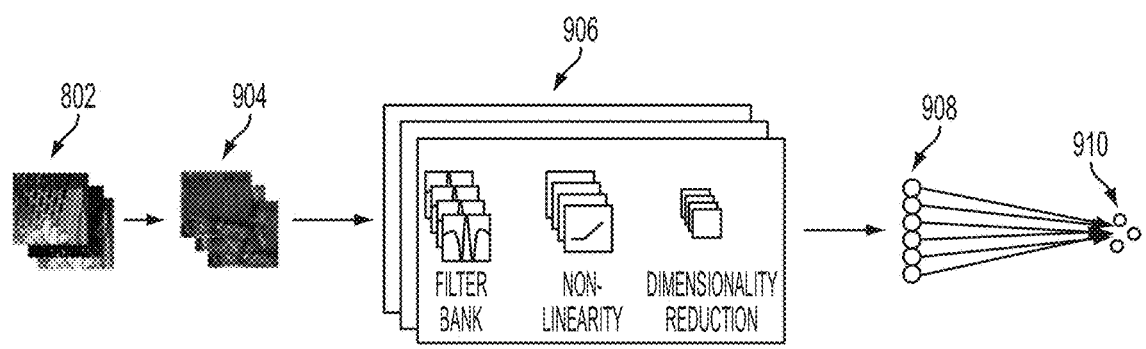
FIG. 9 is an example of a process for determining the composition of a material in an image according to one example.

The computing device can use a characteristic of the material to determine the composition of the material. For example, the computing device can use the characteristic associated with the material and/or the characteristic associated with the elevator to divide a captured image 800 into different segmented regions 802. In some examples, the computing device can use the 3D profile 806 to improve the division of the captured images 800 into different segmented regions 802. As shown in FIG. 9, upon dividing the image into segmented regions 802, the computing device can generate corrected segmented regions 904. The corrected segmented regions 904 can include versions of each of the segmented regions 802 that have been corrected for illumination, scale, and perspective to improve the invariance of these factors. The computing device can include a feature extraction module 906 configured to extract features 908 from each of the corrected segmented regions 904. In some examples, the feature extraction module 906 can apply one or more filters to the corrected segmented region, change the dimensions of a corrected segmented region, or account for non-linearities in the corrected segmented region. The computing device can classify (e.g., by applying a classifier or regressor to) the features 908 to determine the trash content 910 in each of the segmented regions 802. In this manner, the computing device can analyze the segmented regions 802 in the image to determine the amount of trash (and thereby the amount of the desired material) in the material on the elevator. For example, the computing device can determine if the material includes 40% trash and 60% of a desired crop. Based on the ratio, the computing device can apply a scaling factor to the net volume of the material. The result can provide a more accurate determination of the volume of the desired crop being carried by the elevator 104.

Returning to FIG. 2, in some examples, the computing device can operate an extractor fan (not shown) based on the composition of the material. The extractor fan can be part of a primary extractor or a secondary extractor in a crop cleaning system associated with the harvester. Material gathered by the harvester can pass through the crop cleaning system before moving onto the elevator 104. The extractor fan can rotate to blow on the material, which can remove trash and debris from the material. In some examples, based on the amount of trash in the material on the elevator 104, the computing device can change the rate of speed with which the extractor fan spins. If the amount of trash is above a threshold, the computing device can cause the speed of the extractor fan to increase. If the amount of trash is below a threshold, the computing device can cause the speed of the extractor fan to decrease. In some examples, if the extractor fan spins at a higher speed, the extractor fan can blow more trash out of the gathered material, yielding a higher crop-to-trash ratio. In this manner, the computing device can determine the composition of the material and modulate the speed of the extractor fan to control the amount of trash in the material.

In some examples, the harvester can include a primary extractor cleaning system. The primary extractor cleaning system can move around the primary extractor (e.g., primary extractor 110 of FIG. 1) to clean the primary extractor. The computing device can cause the primary extractor cleaning system to disengage (e.g., turn off) if the primary extractor cleaning system gets too close to the 3D sensor 202 (e.g., a camera associated with the 3D sensor 202). This can reduce dust and debris buildup on the 3D sensor 202.

In some examples, the yield measurement system 200 can measure the characteristics of the elevator 104 when the elevator 104 does not include any material. The resulting measurement can act as a baseline or calibration measurement that can be used to account for buildup of dirt and debris, and deformations in the shape of the elevator 104, that may otherwise affect the net volume measurement. For example, the calibration measurement can be subtracted from the net volume measurement to determine the actual volume of the material in the elevator 104. A low-pass filter or a probabilistic filter (e.g., a Kalman filter) can be applied to the actual volume of the material in the elevator 104 to increase accuracy.

In some examples, the yield measurement system 200 can determine if there is no material in the elevator 104 (e.g., for initiating calibration) by monitoring the volume of the material on the elevator 104 and one or more parameters associated with the harvester (e.g., the ground speed, elevator speed, engine load, or engagement of the harvester). For example, the yield measurement system 200 may determine that there is no material in the elevator 104 if the ground speed of the harvester is zero mph for more than seven seconds while the elevator 104 is running. As another example, the yield measurement system 200 may determine that there is no material in the elevator 104 if the crop harvesting system is disengaged for more than five seconds while the elevator 104 is running. Upon the yield measurement system 200 determining that there is no material in the elevator 104, the yield measurement system 200 can automatically measure the characteristics of the elevator 104 (e.g., as described above) to generate or update the calibration measurements. This process of dynamic calibration can account for dirt buildup or deformation in the elevator 104 over time, thereby increasing the accuracy of the yield measurement system 200.

There are numerous possible mounting positions for the 3D sensor 202 for viewing material carried by the elevator 104. In some examples, the 3D sensor 202 can be centered across the width of the elevator 104. This can eliminate or reduce bias with respect to the uneven shape of the material that can pile up on the elevator 104 paddles (e.g., the paddles 502 shown in FIG. 5). In some examples, the 3D sensor 202 can be positioned the farthest distance possible from the elevator 104 (e.g., while avoiding collision with the primary extractor when the elevator 104 is lifted and rotated). The 3D sensor 202 can also be positioned at an angle (e.g., 38°) with respect to the elevator's plane that is not perpendicular to the elevator's plane. For example, the 3D sensor 202 can be positioned at an angle that is less than 90° with respect to the elevator's plane. Positioning and tilting the 3D sensor 202 in such a manner can enhance the results of the image processing algorithms, as described below.

For example, the 3D sensor 202 can include at least two cameras. To generate the 3D profile of the scene captured by the cameras, the computing device can apply an algorithm that matches a pixel from a first image from the first camera to a corresponding pixel in a second image from the second camera. This process can be repeated until the pixels in the first image are mapped to corresponding pixels in the second image. This process can be adversely affected, however, by a pattern of holes (e.g., holes 504 shown in FIG. 5) that can be in the back plate of the elevator 104. For example, rather than mapping a single pixel from the first image to a single pixel from the second image, a pixel from the first image that is associated with a hole in the back plate may be matched to numerous pixels from the second image associated with multiple holes in the back plate. This can generate errors in the output from the algorithm. In some examples, positioning the cameras at an angle can cause a perspective distortion in the images captured by the cameras. This can allow the computing device to more readily find unique, corresponding pixels between camera images, thereby minimizing the correlation errors. In other examples, the output of the algorithms can be improved by making the pattern of holes in the back plate irregular, which can reduce correlation errors.

In some examples, the yield measurement system 200 can include a lighting system 204. The lighting system 204 can include one or more lights (e.g., light bulbs or light emitting diodes). In some examples, the lighting system 204 can include one or more sensors (e.g., a photodetector) for detecting an amount of ambient light. The computing device can operate the one or more lights based on the detected level of ambient light from the one or more sensors.

In examples in which the 3D sensor 202 includes a camera, the lighting system 204 can illuminate the field of view of the cameras. This can allow the yield measurement system 200 to be used in environments with minimal or no ambient light. For example, the lighting system 204 can allow the yield measurement system 200 to be used at dawn, nighttime, dusk, or during poor weather conditions (e.g., cloudy days).

Also, in examples in which the 3D sensor 202 includes a camera, the lighting system 204 can reduce the exposure time of the cameras. This can allow the exposure time to be fast enough to reduce or eliminate motion blur in images captured by the cameras, even if the elevator 104 (and material on the elevator 104) is moving at a high rate of speed. For example, to minimize the exposure time of the cameras, the lighting system 204 can provide additional light to the scene captured by the cameras. The additional light can sufficiently illuminate the scene such that the cameras can capture images using short exposure times.

Figure 4:
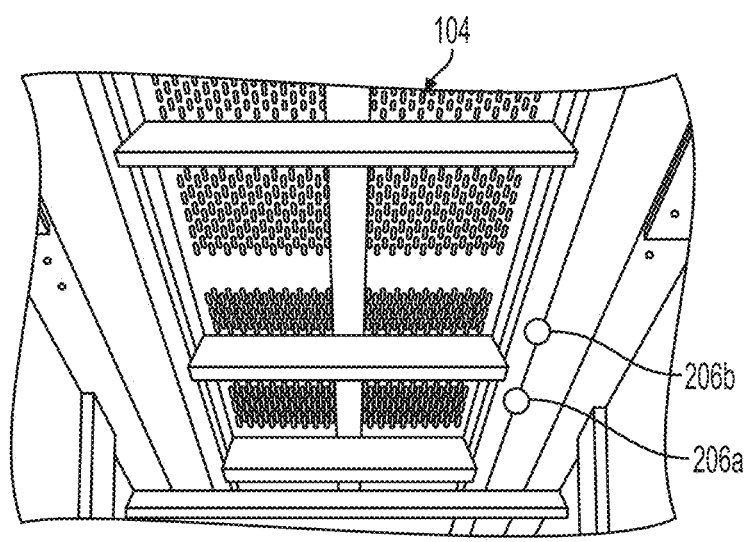
FIG. 4 is a perspective view of an elevator for use with a yield measurement system according to one example.

The yield measurement system 200 can include one or more paddle sensors 206 (e.g., Hall effect transducers). In some examples, the paddle sensors 206 can be positioned on the side of the elevator 104. In other examples (e.g., the example shown in FIG. 4), the paddle sensors 206 can be positioned below the elevator 104. The paddle sensors 206 can detect when a paddle passes by the paddle sensors 206 and transmit an associated sensor signal to the computing device.

In some examples, the computing device can receive and use the paddle sensor signals to trigger data capturing by the 3D sensor 202. For example, the computing device can receive paddle sensor signals associated with a paddle passing a paddle sensor 206 and substantially simultaneously cause the 3D sensor 202 to capture data (e.g., to cause a camera associated with the 3D sensor 202 to capture an image). By using the paddle sensors 206 to trigger data capturing, the paddles can be in substantially the same position within the detectable area of the 3D sensor 202 each time data is captured. This can improve the accuracy of the algorithms used to determine the volume of the material in the elevator 104.

In some examples, the computing device can use the paddle sensor signals to determine the speed of the elevator 104. For example, a single paddle sensor 206 can be positioned on the side of the elevator 104. As the paddles pass the paddle sensor 206, the paddle sensor 206 can detect the paddle and transmit associated sensor signals to the computing device. If the paddles on the elevator 104 are spaced uniformly, the computing device can divide the spacing amount by the time period between two sensor signals to determine the speed of the elevator 104. For example, if the time period between two sensor signals is 200 ms, and the spacing between the paddles is 20 cm, then the computing device can divide 200 ms by 20 cm to determine that the speed is 1 m/s.

As another example, two paddle sensors 206 can be positioned on the side of the elevator 104. The computing device can determine the speed of the elevator based on paddle sensor signals from the two paddle sensors 206, even if the paddles are not spaced uniformly. For example, the computing device can determine the amount of time between when a paddle passes the first paddle sensor 206 (activating the first paddle sensor 206) and when the paddle passes the second paddle sensor 206 (activating the second paddle sensor 206). If the spacing between the two paddle sensors 206 is known, the computing device can calculate the speed of the elevator by dividing the spacing amount by the amount of time between paddle sensor 206 activations. For example, if the spacing between the two paddle sensors 206 is 10 cm, and the time difference between the activation of the two paddle sensors 206 is 0.1 s, then the computing device can divide 10 cm by 0.1 s to determine that the speed is 1 m/s.

Other methods can additionally or alternatively be used to determine the speed of the elevator 104. For example, an encoder can be positioned on a motor (e.g., a hydraulic motor) or gear that moves the elevator 104. The computing device can use sensor signals from the encoder to determine the speed of the elevator.

Figure 5:
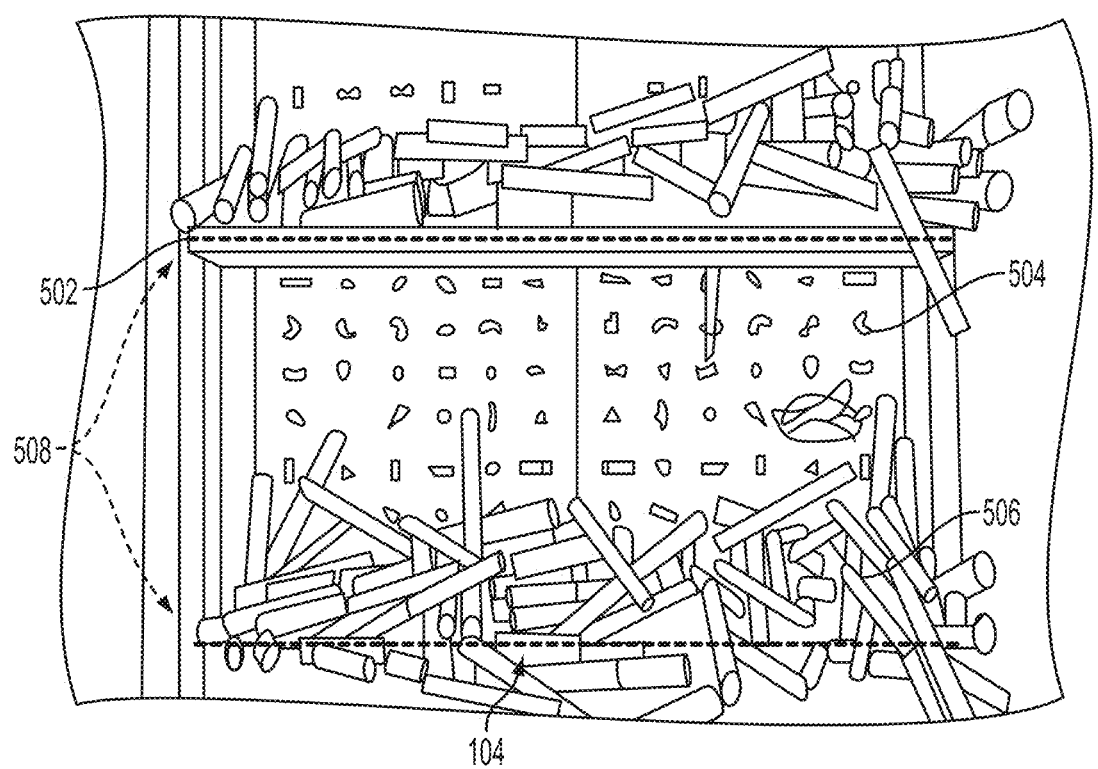
FIG. 5 is a top view of an elevator with paddles for use with a yield measurement system according to one example.

In examples in which the 3D sensor 202 includes a camera, the computing device can use the position of the paddles in camera images to determine the speed of the elevator 104. For instance, as shown in FIG. 5, the dashed lines 508 can represent the locations of the paddles 502 as determined by the computing device based on camera images. The computing device can use the locations of the paddles 502, and the time between each image being taken, to determine the speed of the elevator. For example, the computing device can determine the distance a paddle 502 moved (e.g., 10 cm) between two images. The computing device can divide the distance the paddle 502 moved by the amount of time between taking the two images (0.1 s) to determine the speed of the elevator (1 m/s). In some examples, the speed of the paddles 502 determined based on image data can be more accurate than the speed of the paddles 502 determined based on the paddle sensors 206. The computing device can also receive one or more parameters associated with the harvester (e.g., engine speed) and use the parameters to increase the accuracy of the determined elevator speed.

Returning to FIG. 2, the yield measurement system 200 can use the data from the 3D sensor 202 and the speed of the elevator 104 to determine the yield of the material. For example, the computing device can use data from the 3D sensor 202 to generate a 3D profile of the scene within the detectable area of the 3D sensor 202. The computing device can use the 3D profile to determine the instantaneous volume of the desired crop on the elevator 104. The computing device can multiply the instantaneous volume by the speed of the elevator to estimate the total volume of the desired crop carried by the elevator 104. The computing device can also receive data (e.g., via a CAN bus connection with the harvester's electrical system) associated with the harvester, such as the speed, GPS location, and operational status of the harvester. The computing device can determine, based on the total volume of the desired crop carried by the elevator 104 and the data associated with the harvester, an instantaneous yield measurement of the desired crop.

Figure 6:
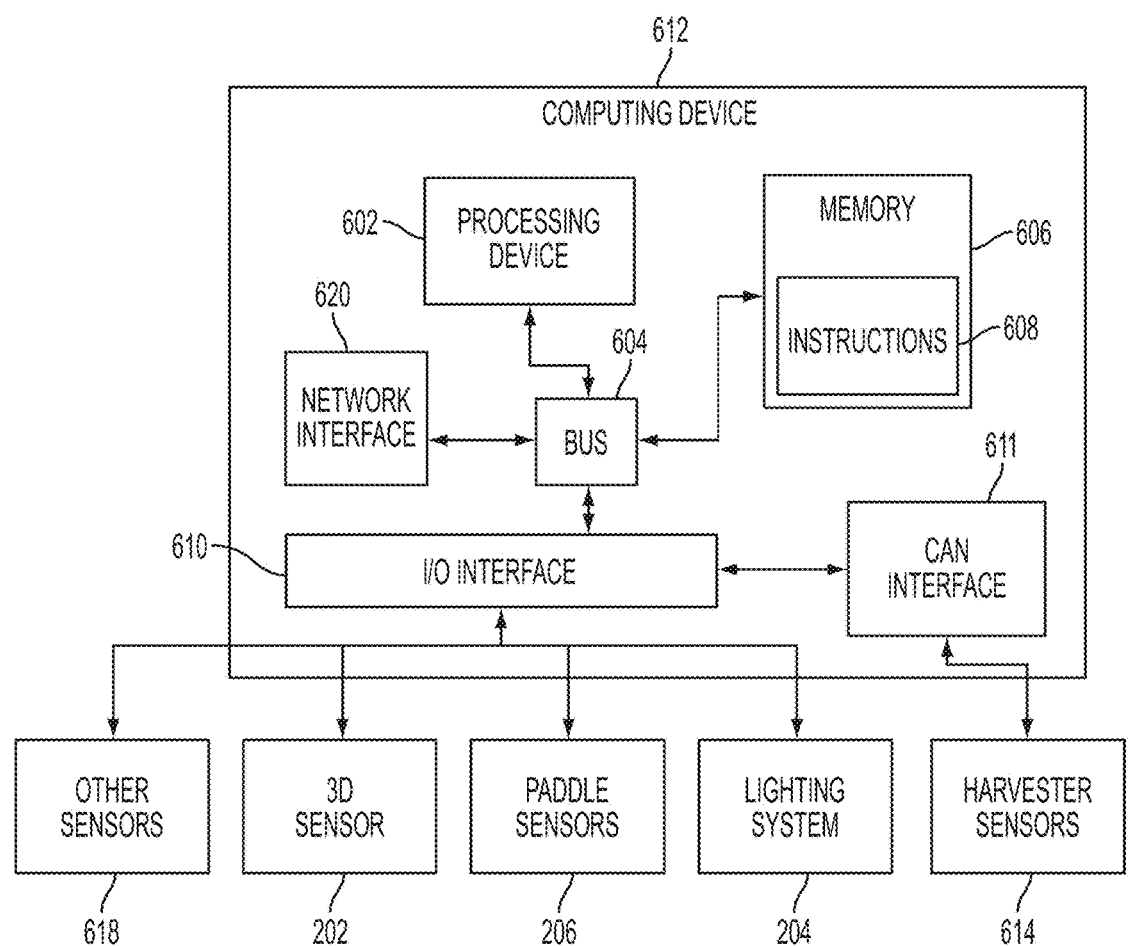
FIG. 6 is a block diagram depicting an example of a computing device for use with a yield measurement system according to one example.

FIG. 6 is a block diagram depicting an example of a computing device 612 for use with a yield measurement system according to one example. The computing device 612 can include a network interface 620. The network interface 620 can represent one or more components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

The computing device 612 can include an input/output interface 610. The I/O interface 610 can be used to facilitate a connection to hardware used to input data (e.g., buttons, switches, joysticks, touch-sensitive surfaces, or other user input devices) or output data (e.g., displays, touch-screen displays, or other user interface devices). For example, the I/O interface 610 can be in wired or wireless communication with a 3D sensor 202 (e.g., a camera, a 3D laser scanner, an ultrasonic transducer, a range sensor, a structured light camera, a 3D camera, or a flash LIDAR), paddle sensors 206 (e.g., Hall effect sensors), a lighting system 204 (e.g., for detecting low light and illuminating a field of view of a camera associated with the 3D sensor 202), and other sensors 618 (e.g., a shaft encoder). In some examples, the computing device 612 can be in wired or wireless communication with the 3D sensor 202, paddle sensors 206, lighting system 204, and other sensors 618 via the network interface 620.

The I/O interface can be in communication with, or include, a controller area network (CAN) interface 611. In some examples, the CAN interface 611 can be directly in communication with the bus 604 or another component of the computing device 612. The CAN interface 611 can be in wired (e.g., via a CAN bus) or wireless communication with harvester sensors 614 over a CAN bus and configured to receive data from the harvester sensors 614. The harvester sensors 614 can detect various parameters of the harvester. For example, the harvester sensors 614 can detect the ground speed, GPS location, primary extractor speed, secondary extractor speed, primary fan speed, secondary fan speed, engine rpm, direction, crop processing engagement, operational status, a parameter associated with a topper, and other parameters of the harvester. In some examples, the harvester sensors 614 can detect environmental characteristics external to the harvester, such as the harvest width and the farm condition (e.g., burn vs. green sugar cane). The harvester sensors 614 can transmit sensor signals to the CAN interface 611.

The computing device 612 includes a processing device 602. The processing device 602 can execute one or more operations for determining a yield measurement of a material. The processing device 602 can execute instructions 608 stored in the memory device 606 to perform the operations. The processing device 602 can include one processing device or multiple processing devices. Non-limiting examples of the processing device 602 include a Farm-Programmable Gate Array ("FPGA"), an application-specific integrated circuit ("ASIC"), a microprocessor, etc.

The processing device 602 can be communicatively coupled to the memory device 606 via the bus 604. The non-volatile memory device 606 may include any type of memory device that retains stored information when powered off. Non-limiting examples of the memory device 606 include electrically erasable and programmable read-only memory ("EEPROM"), flash memory, or any other type of non-volatile memory. In some aspects, at least some of the memory device 606 can include a medium from which the processing device 602 can read the instructions 608. A computer-readable medium can include electronic, optical, magnetic, or other storage devices capable of providing the processing device 602 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions may include processor-specific instructions generated by a compiler or an interpreter from code written in any suitable computer-programming language, including, for example, C, C++, C#, etc. In some examples, the memory 606 can include an image processing module (not shown). The processing device 602 can use the image processing module to perform one or more image processing tasks on data received from the 3D sensor 202.

In some examples, the processing device 602 can receive data from the 3D sensor 202. The processing device 602 can apply the data to algorithms to determine an instantaneous volume of the material on a portion of the elevator. The processing device 602 can also receive sensor data from the paddle sensors 206. The processing device 602 can apply the sensor data from the paddle sensors 206 to algorithms to determine the speed of the elevator. The processing device 602 can multiply the instantaneous volume by the speed of the elevator to estimate the total volume of the material on the elevator. The processing device 602 can further receive harvester data from the harvester sensors 614. The processing device 602 can integrate the harvester data with the estimate of the total volume of the material to generate a yield map in real-time.

Figure 7:
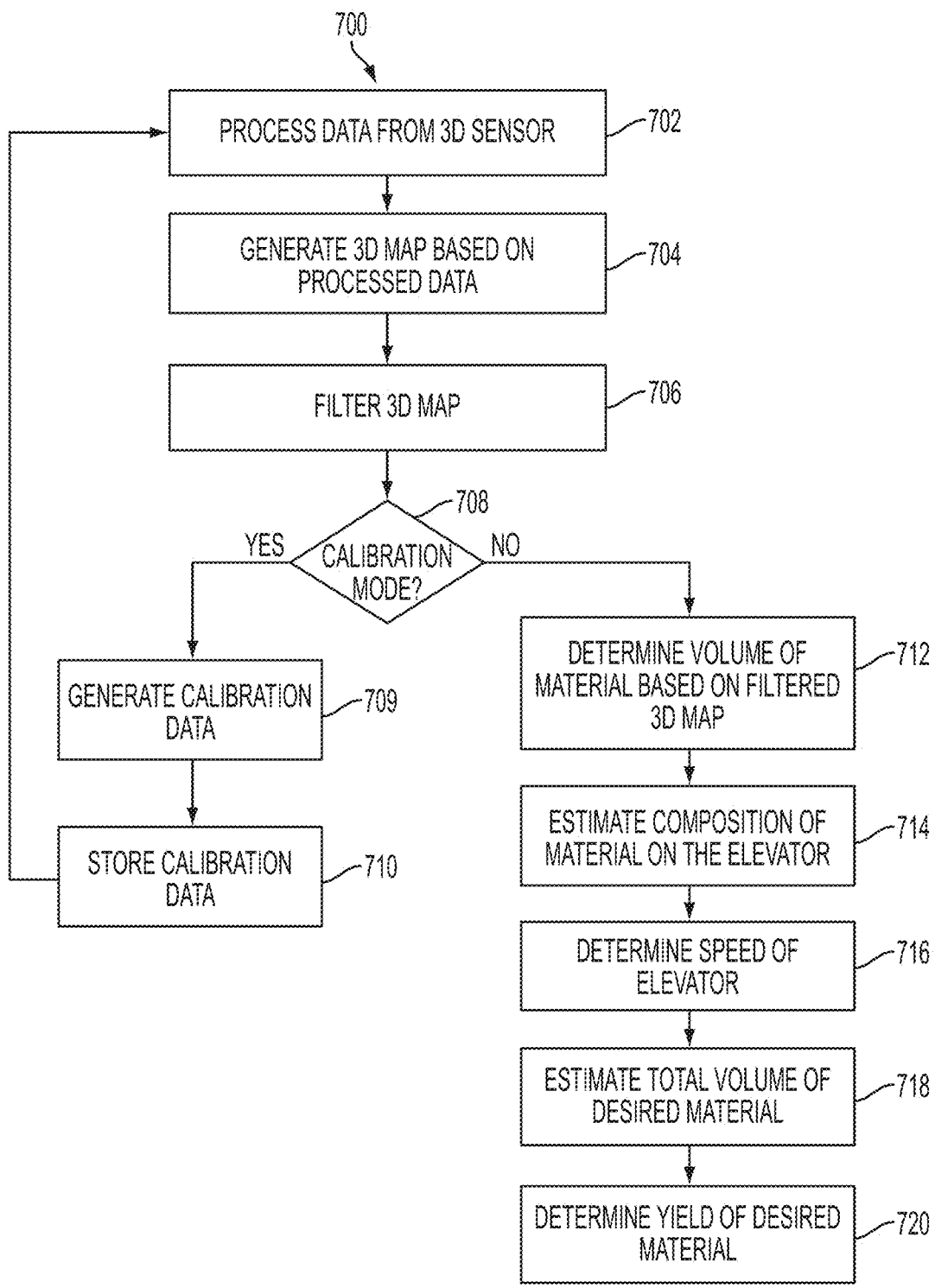
FIG. 7 is a block diagram of an example of a process for measuring the yield of a material carried by the elevator according to one example.

FIG. 7 is a block diagram of an example of a process 700 for measuring the volume of a material carried by the elevator according to one example. Some examples can include more, fewer, or different steps than the steps depicted in FIG. 7. The steps below are described with reference to components described above with regard to computing device 612 shown in FIG. 6.

In block 702, the processing device 602 processes data from the 3D sensor 202. The processing device 602 can receive the data via a wired or wireless connection with the 3D sensor 202. The data can be associated with a portion of the elevator within the detectable area of the 3D sensor 202.

In some examples, the processing device 602 can apply one or more algorithms to the data to process the data. For example, the processing device 602 can rectify, perform disparity computations on, and perform speckle filtering on the data.

In block 704, the processing device 602 generates a 3D map (e.g., 3D topological map) based on the processed data. The processing device 602 can execute one or more algorithms to produce the 3D map. In some examples, the processing device 602 can apply triangulation to generate a 3D profile of the processed data. Triangulation can include matching a pixel from a first image taken by a first camera to an associated pixel in a second image taken by a second camera. The difference between the pixel location in the first image and the corresponding pixel location in the second image can be the disparity. Based on the pixel location in the first image, the disparity, and a distance in real space (e.g., in meters) between the first camera and the second camera, the computing device can determine a 3D location in real space associated with the pixel. This process can be repeated for all of the pixels in the first image and second image to generate a 3D profile corresponding to the processed camera data.

In some examples, upon generating the 3D profile, the processing device 602 can change the coordinate system of the 3D profile to a frame aligned with the elevator plane, such that the y-axis follows along the paddle direction, the z-axis points from the elevator to the 3D sensor 202 (e.g., a camera in the 3D sensor), and X is orthogonal to the y-axis and the z-axis. The origin of the frame can be centered in the detectable area of the 3D sensor 202 (e.g., within the view of a camera of the 3D sensor 202). The processing device 602 can divide the 3D profile into a grid of squares (e.g., 1.25 cm by 1.25 cm in size) associated with the plane of the elevator. The processing device 602 can discard the points that fall outside of the grid of squares. For each square in the grid of squares, the processing device 602 can determine the robust maximum height (e.g., using a median filter) relative to the plane of the elevator. Based on the grid of squares and the robust maximum heights, the processing device 602 can generate the 3D map. Each cell in the 3D map can have an associated robust maximum height.

In block 706, the processing device 602 filters the 3D map. The processing device 602 can filter the 3D map to remove noise, erroneous data, and extraneous data. This can result in a more accurate 3D map. For example, the processing device 602 can filter out, using a spatial filter, portions of the 3D map associated with calibration data (e.g., as discussed with respect to block 709). For instance, the processing device 602 can filter portions of the 3D map associated with the elevator paddles. This can allow the processing device 602 to generate an instantaneous volume measurement unadulterated by the volume of the paddles.

In block 708, the processing device 602 determines if the yield measurement system is in a calibration mode. For example, the processing device 602 can consult a location in memory 606 to determine if the yield measurement system is in the calibration mode. If the yield measurement system is in the calibration mode, the process 700 can continue to block 709.

In block 709, the processing device 602 generates calibration data. The processing device 602 can generate the calibration data by analyzing the 3D map to determine the location of the elevator back plate and any deformations (e.g., bends or ridges) in the elevator back plate. The processing device 602 can also analyze the 3D map to determine the characteristics of the paddles. The location of the elevator back plate, any deformations in the elevator back plate, and the characteristics of the paddles can be included in the calibration data.

In block 710, the processing device 602 stores the calibration data. In some examples, the processing device 602 can store the calibration data in memory 606. In other examples, the processing device 602 may store the data elsewhere, such as in a remote database or computing device 612 (e.g., by communicating with the remote database or computing device 612 via network interface 620).

If the yield measurement system is not in a calibration mode, the process 700 can continue to block 712. In block 712, the processing device 602 determines the volume of the material based on the filtered 3D map. For example, the processing device 602 can subtract a calibration value associated with the plane of the elevator back plate from the robust maximum height (e.g., determined in block 704) of the cell. This can produce the height of the material in the cell. Because each cell can have a known area (e.g., 1.25 cm×1.25 cm=1.5625 cm$^2$ area), the processing device 602 can multiply the height of the material in the cell by the area of the cell to determine the volume of the material in the cell. The processing device 602 can repeat this process for all of the cells to determine the total instantaneous volume of the material on the elevator.

In block 714, the processing device 602 can estimate the composition of the material detectable by the 3D sensor 202. For example, data from the 3D sensor 202 can be associated with images of the surface area of the material on the elevator. The processing device 602 can determine characteristics (e.g., the sizes, shapes, textures, and colors) associated with the surface area of the material. Based on the characteristics, the processing device 602 can determine the ratio of a desired material to extraneous material in the surface area of the material. For example, the processing device 602 may determine that the surface area of the material includes 80% of the desired material and 20% trash. Based on the ratio of desired material to extraneous material, the processing device 602 can apply a scaling factor to the instantaneous volume measurement (e.g., determined in block 712) to estimate the volume of the material associated with the desired material.

In block 716, the processing device 602 determines the speed of the elevator. In some examples, the processing device 602 can rely on sensor signals from the paddle sensors 206 to determine the speed of the elevator. In other examples, the processing device 602 can apply algorithms to data from the 3D sensor 202 to determine the speed of the elevator. In still other examples, the processing device 602 can use sensor signals from other sensors 618 (e.g., a shaft encoder) to determine the speed of the elevator.

In block 718, the processing device 602 estimates the total instantaneous volume of the desired material on the elevator. In some examples, the processing device 602 can apply a scaling factor (based on the composition determined in block 714) to the instantaneous volume estimate from block 707. This can generate an estimate of the instantaneous volume of the desired material. The processing device 602 can multiply this instantaneous volume estimate by the speed of the elevator to determine the total instantaneous volume of the desired material on the elevator.

In block 720, the processing device 602 determines the instantaneous yield of the desired material. The processing device 602 can determine the instantaneous yield of the desired material based on the total instantaneous volume of the desired material and harvester parameters. For example, the processing device 602 can receive data associated with the speed, GPS location, or direction of the harvester from the harvester sensors 614. The processing device 602 can integrate the total instantaneous volume of the desired material (e.g., from block 718) with the GPS location to determine the instantaneous yield of the desired material at that GPS location. In this manner, the processing device 602 can generate a real-time yield map representing the yield of the desired material at various locations on the farm. In some examples, the instantaneous yield can be integrated over time so that a measurement of the accumulated yield of the harvested material can be generated. The instantaneous yield can be further tuned based on the weight of the material, which can be determined when the material arrives at a processing mill or by using in-farm density or weight measurement methods.

Figure 10:
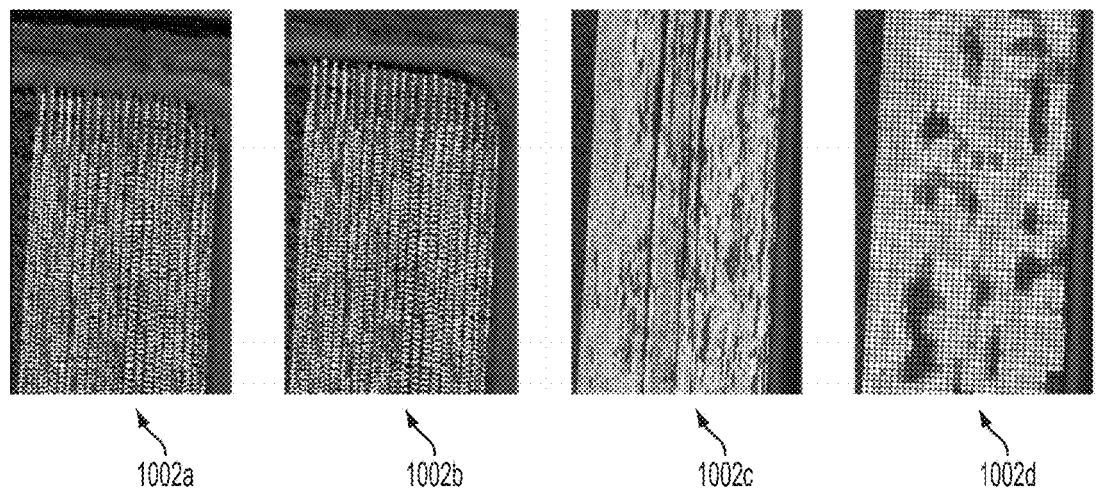
FIG. 10 shows examples of yield maps output by a yield measurement system according to one example.

FIG. 10 shows yield maps 1002*a-d* output by a yield measurement system according to one example. Yield map 1002*a* depicts a yield map generated using raw yield data. In some examples, one or more algorithms can be applied to the raw yield data to increase the accuracy of the yield map.

For example, the gathered material may not always steadily flow through the harvester. Rather, material can accumulate in the harvester before being passed onto the elevator 104. If the material accumulates and is passed in bulk onto the elevator 104, the yield measurement system 200 may measure an erroneously high yield value. The computing device can account for these yield "spikes" by tracking the time and spatial area covered during the accumulation period and spatially reapportioning the high yield values. For example, the computing device can apply the times in which the yield spikes occurred and one or more harvester parameters (e.g., GPS location or harvester chopper pressure) to algorithms to spatially redistribute the high yield values. The algorithms can be dynamically selected by a user from a number of options. For example, the options can include algorithms for determining: (i) an average flow during the accumulation region, or (ii) a pattern fit flow rate based on a previous harvester pass across the same region of the farm. This can reduce errors in the yield map due to accumulation of the material, thereby increasing the precision and accuracy of the yield map.

As another example, the computing device can eliminate data points collected by the harvester when the harvester is not gathering crops. The computing device can determine when the harvester is not gathering crops based on one or more parameters associated with the harvester. For example, the computing device can determine if the harvester is not gathering crops based on the height of the base cutter (e.g., if the height of the base cutter is above or below a threshold), the drive engagement of the elevator, the instantaneous volume of the material on the elevator (e.g., if the instantaneous volume is above or below a threshold), or a GPS location (e.g., if the harvester is positioned in an area known not to have crops or that is outside a predetermined farm boundary). Yield map 1002*b* depicts an example of a yield map in which the raw yield data collected by the harvester when not gathering crops has been eliminated.

As still another example, there can be a time delay between when material is actually gathered from the farm by the harvester and when the GPS receiver determines the GPS location associated with the material. This time delay can result in the GPS receiver tagging the gathered material with a GPS location that is incorrect by a certain distance. The computing device can apply one or more algorithms to correct such inaccuracies. For example, based on data from the harvester sensors 614 (e.g., the ground speed of the harvester and the speed of the elevator), the computing device can determine the distance in which the GPS location may be off. The computing device can correct the GPS location of the material based on this distance. The corrected GPS location can more accurately reflect the precise spatial location in the farm from which the material was gathered. Yield map 1002*c* depicts an example of a yield map generated using corrected GPS locations.

As yet another example, spatial filtering can be used to improve the visual representation of the yield data (e.g., the yield map). Spatial filtering, rather than time series filtering, can allow for multi-dimensional filtering of the yield data. The characteristics of the spatial filtering can be adjusted to meet end user goals. For example, Kriging filtering or Inverse Weighted Distance filtering can be used to create a smoothed response of the yield data across various zones of the farm in which the crops are being collected. Yield map 1002*d* depicts an example of a yield map generated using corrected GPS locations and spatial filtering.

In some examples, the computing device 612 can also produce real-time measurements of machinery mass productivity. Machinery mass productivity can represent the amount of material (e.g., in tons) produced per hour. The computing device 612 can determine the machinery mass productivity based on the volume (or yield) of the material and the amount of time taken to produce the volume (or yield) of the material. Machinery mass productivity can be used to assess capital asset utilization and to optimize support equipment logistics and harvesting logistics.

In some examples, the yield data and machinery mass productivity can be presented to the operator through a user interface (e.g., a dynamic user interface). For example, a yield map and machinery mass productivity measurements can be presented through a user interface that is output on a display that is in communication with the computing device 612. This can facilitate data collection and operational feedback. In some examples, the yield data can be used to optimize transportation of the harvested crops and the support equipment logistics associated with harvesting. The machinery mass productivity can guide business rules associated with service, maintenance, and operator training of production teams (e.g., sugarcane production teams).

Base Cutter Height Control System

Certain aspects and features of the present disclosure are directed to a base cutter height control system for measuring the height of a base cutter on a harvester. The base cutter height control system can include a camera system with at least two cameras. The cameras can capture images of material (e.g., stubbles) cut by the base cutter and passing under the harvester. The base cutter height control system can apply image processing to the images to determine the height of base cutter. Based on the determined height of the base cutter, the base cutter height control system can change the height of the base cutter (e.g., to an optimal or preferred height).

In some examples, the harvester can include both the yield measurement system (described above) and the base cutter height control system (described below).

Figure 11:
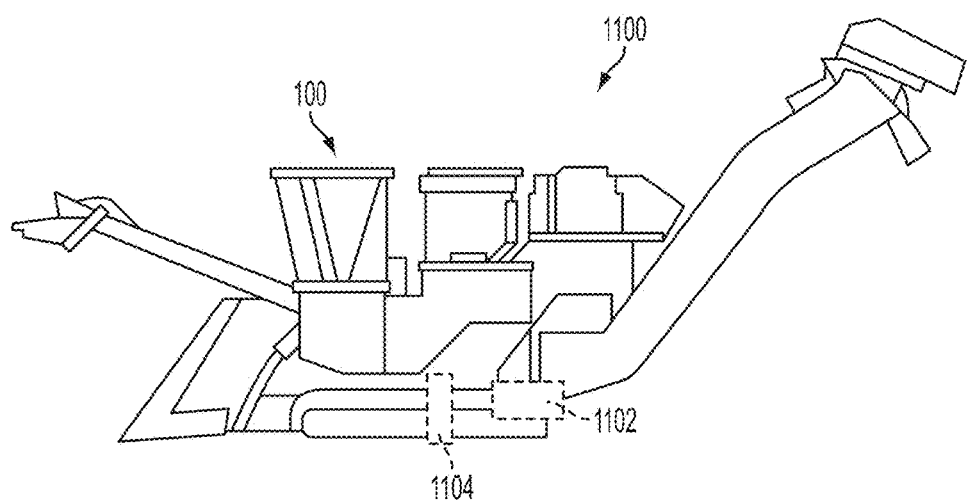
FIG. 11 is a side perspective view of an example of a harvester for use with a base cutter height control system according to one example.

FIG. 11 is a side perspective view of an example of a harvester 100 for use with a base cutter height control system 1100 according to one example. The base cutter height control system 1100 can include a 3D sensor 1102 mounted to a harvester 100. The 3D sensor can include one or more of a camera, a 3D laser scanner, an ultrasonic transducer, a range sensor, a structured light camera, a 3D camera, and a flash LIDAR.

Figure 12:
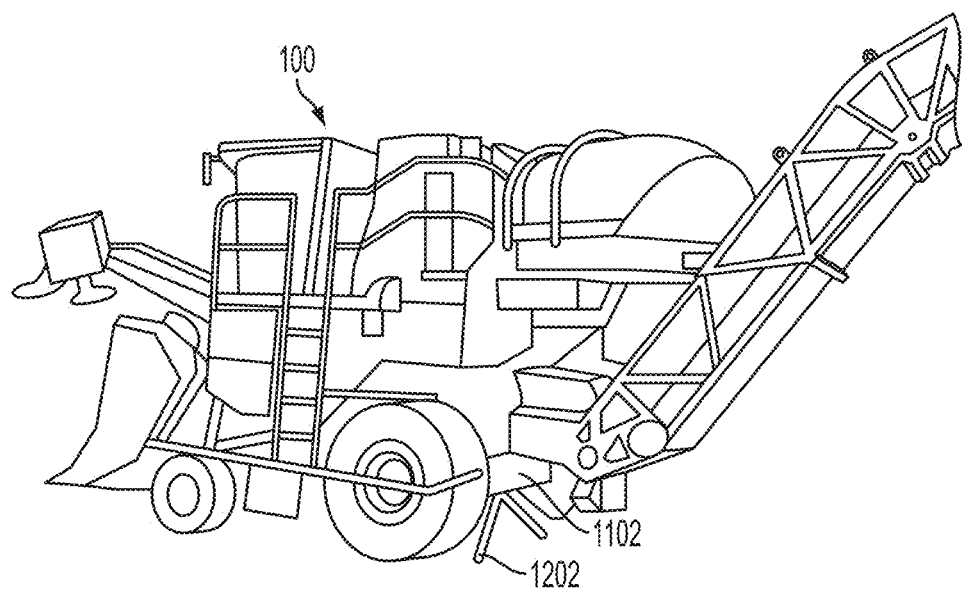
FIG. 12 is a back perspective view of an example of a harvester for use with a base cutter height control system according to one example.

The 3D sensor 1102 can be mounted in any suitable location for detecting one or more characteristics of a ground area that is being processed or has previously been processed by the blades of the base cutter. For example, the 3D sensor 1102 can be positioned underneath the harvester 100, in front of the harvester 100, or to the back of the harvester 100. In the example shown in FIG. 12, the 3D sensor 1102 is mounted underneath the harvester 100 and between the back wheels of the harvester. In this example, the 3D sensor 1102 can detect the area 1202 immediately behind and between the back wheels of the harvester 100.

In some examples, the base cutter height control system 1100 can include a debris barrier 1104. The debris barrier 1104 can be positioned near, around, or in front of the 3D sensor 1102 to prevent dust or debris from entering the detectable area (e.g., the field of view) of the 3D sensor 1102. In some examples, the debris barrier 1104 can include curtains or partitions (e.g., plastic or metal partitions).

Figure 13:
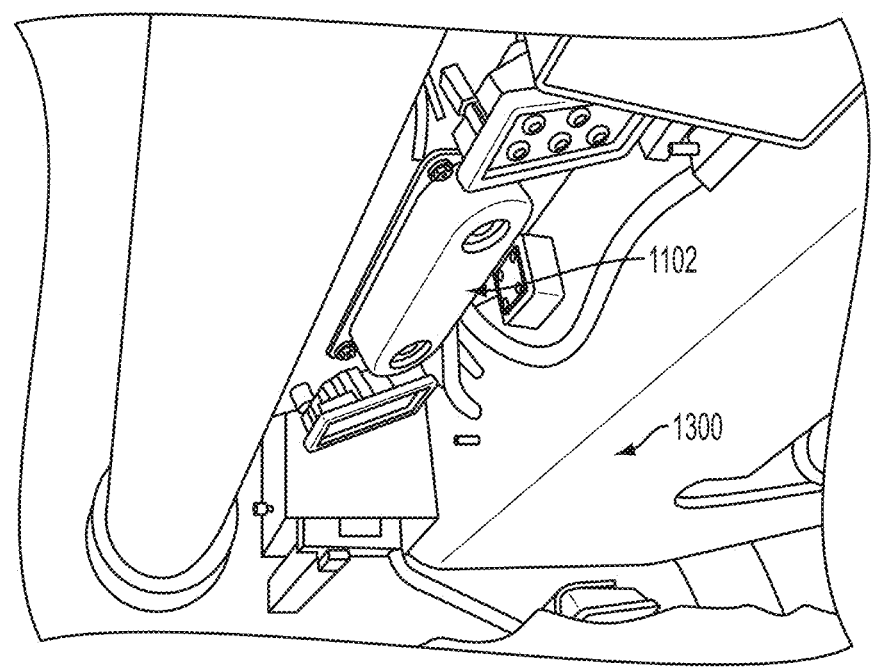
FIG. 13 is a perspective view of an example of a camera system mounted to the underside of a harvester for use with a base cutter height control system according to one example.

FIG. 13 is a perspective view of an example of a 3D sensor 1102 mounted to the underside of a harvester 1300 for use with a base cutter height control system according to one example. The 3D sensor 1102 can include two or more cameras. The cameras can be configured similarly to the cameras described with respect to FIGS. 2-3.

Figure 14:
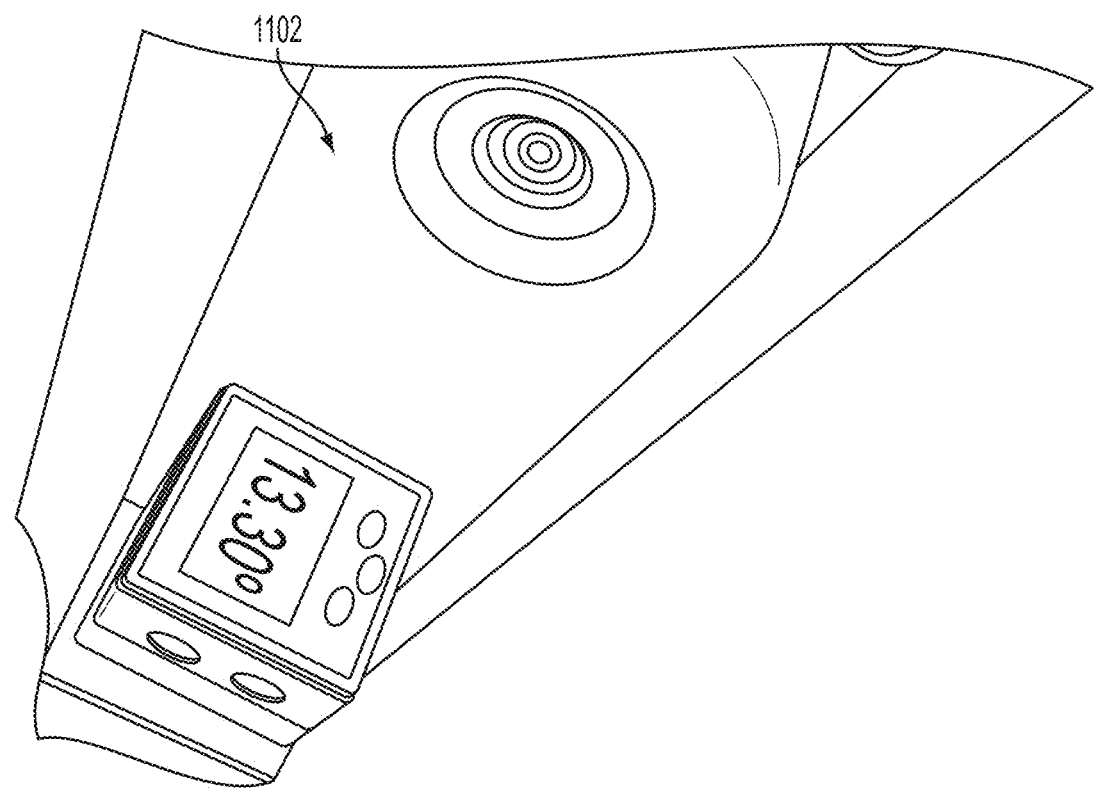
FIG. 14 is a perspective view of an example of a camera system mounted at an angle to the underside of a harvester and for use with a base cutter height control system according to one example.

The 3D sensor 1102 can be mounted to the harvester on an angle (e.g., a pitch angle). The angle can be between 0 degrees and 90 degrees with respect to the plane (e.g., geometric plane) of the ground. In some examples, the angle can be configured to allow the 3D sensor 1102 to view an area that is not directly perpendicular to the ground. For example, as shown in FIG. 14, the 3D sensor 1102 can be mounted to the harvester at an angle of 13.30 degrees.

Figure 15:
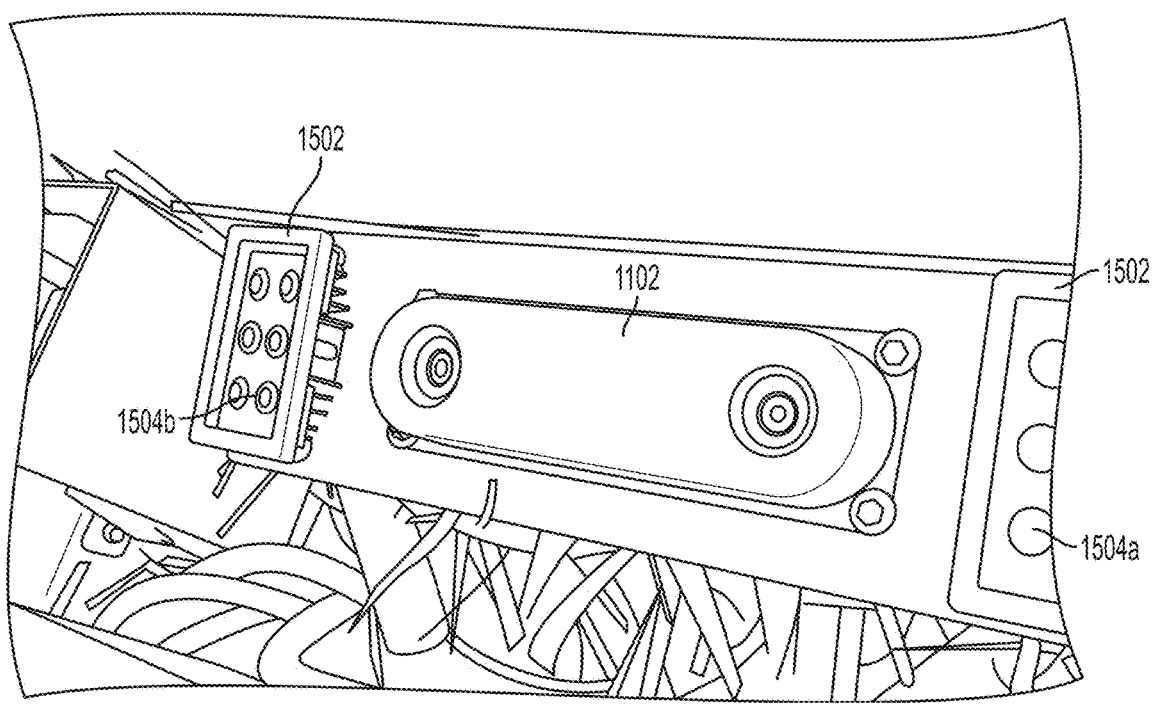
FIG. 15 is a perspective view of an example of a lighting system 1502 for use with a base cutter height control system according to one example.

FIG. 15 is a perspective view of an example of a lighting system 1502 for use with a base cutter height control system according to one example. The lighting system 1502 can include one or more lights 1504a, 1504b and one or more sensors (not shown) for detecting the amount of ambient light. For example, the lighting system 1502 can include one light 1504a positioned at one lateral end of the 3D sensor 1102 and another light 1504b positioned at another lateral end of the 3D sensor 1102. The lights 1504a, 1504b can be separate from or integrated with a housing of the 3D sensor 1102. In some examples, the lights 1504a, 1504b can include a protective housing configured to protect the lights 1504a, 1504b from dust and debris. The protective housing can include plastic, rubber, Plexiglas, or metal.

The base cutter height control system can operate the lights 1504a, 1504b. In some examples, the base cutter height control system can operate the lights 1504a, 1504b based on the detected level of ambient light from the one or more ambient light sensors. This can allow the base cutter height control system to be used in times of low to no ambient light. This can further allow the cameras associated with the 3D sensor 1102 to have short enough exposure times to reduce or eliminate motion blur, even if the harvester is moving at a high rate of speed.

The base cutter height control system can include a computing device (e.g., similar to the computing device 612 of FIG. 6). In some examples, the computing device can receive sensor signals from the ambient light sensors in the lighting system and, based on the sensor signals, operate the lights.

The computing device can also receive data from the 3D sensor 1102. The data can be associated with cut material (e.g., stubbles) passing beneath or near to the harvester. The computing device can apply one or more algorithms (e.g., stereovision algorithms) to the data (or a filtered version of the data) to generate a 2.5 dimensional (3D) map of the ground. Based on the 3D map, the computing device can determine a profile of the ground.

In some examples, the computing device can use the profile of the ground to determine the (i) row lateral position; (ii) row height over ground; (iii) material height; (iv) lateral position of the material; and (v) desired base cutter height setting. In some examples, the computing device can generate a geographic map representing the material height data associated with various locations in the field.

Figure 16:
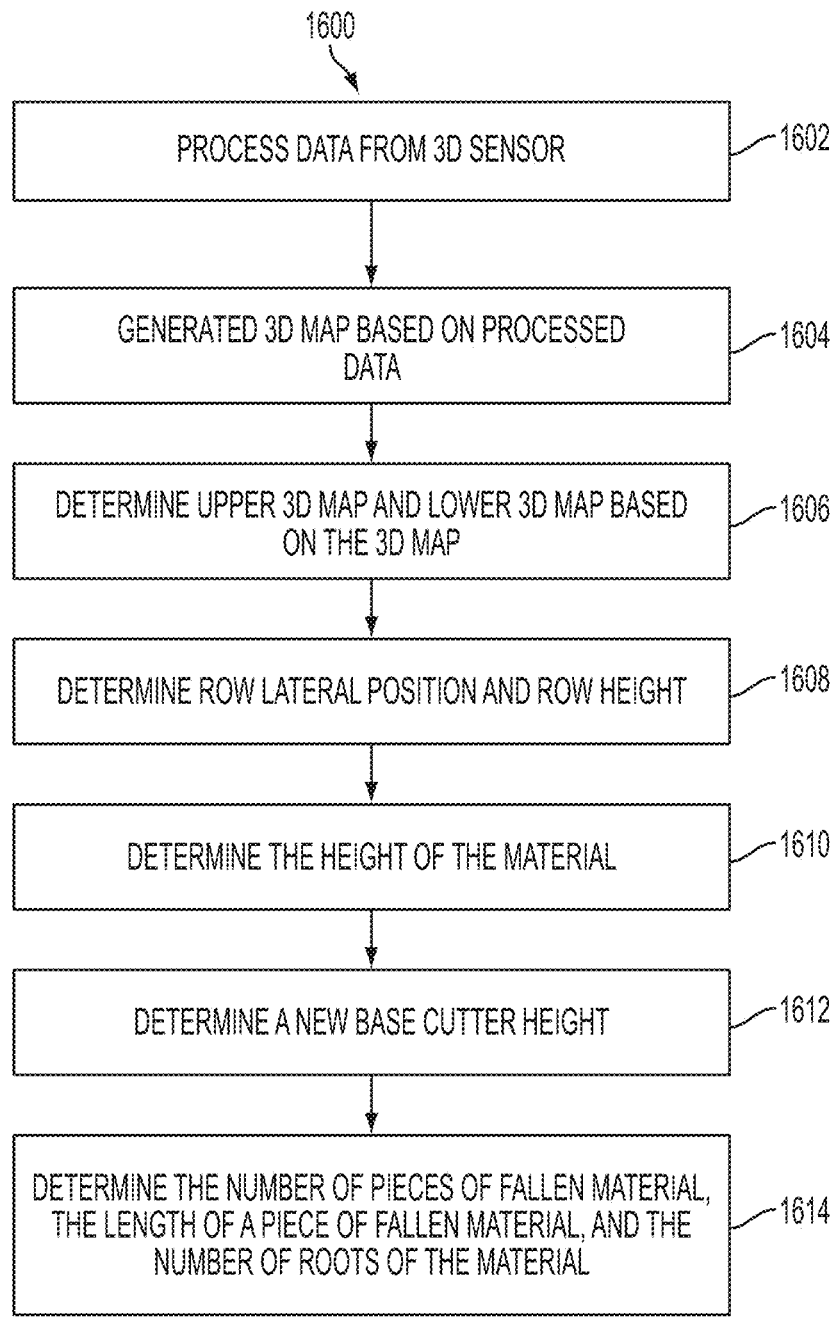
FIG. 16 is a block diagram of an example of a process for determining a new base cutter height according to one example.

FIG. 16 is a block diagram of an example of a process 1600 for controlling a base cutter height according to one example. Some examples can include more, fewer, or different steps than the steps depicted in FIG. 16. The steps below are described with reference to components described above with regard to computing device 612 shown in FIG. 6.

In block 1602, the processing device 602 processes data from the 3D sensor 202. The processing device 602 can receive the data via a wired or wireless connection with the 3D sensor 202. The data can be associated with material within the detectable area of the 3D sensor 202. The data can be, or can be converted, to 3D profile by the processing device 602. For example, the processing device 602 can convert the data to 3D profile using triangulation or any other method.

The processing device 602 can apply one or more algorithms to the data to process the data. In some examples, the processing device 602 can filter the data to remove noise and erroneous data. For example, the computing device can apply a filter to the data to reduce the effect of an airborne material (e.g., a cut piece of sugar cane) obscuring the field of view of the camera associated with the 3D sensor 202.

In some examples, the processing device 602 can calibrate the data. For example, the harvester can be driven on flat ground. The processing device 602 can use data from the 3D sensor 202 to determine the position and orientation of the 3D sensor 202 with respect to the ground. The processing device 602 can store the position and orientation and use the position and orientation to calibrate the data.

Figure 17:
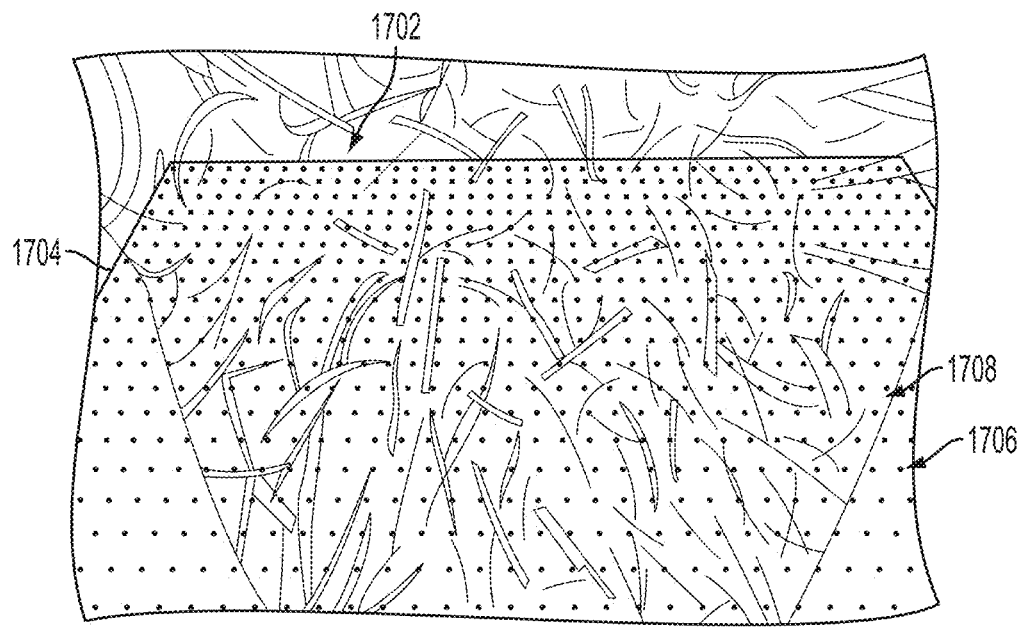
FIG. 17 is a graph showing an example of a 3D map for use with a base cutter height control system according to one example.

In block 1604, the processing device 602 generates a 3D map based on the processed data. The 3D map can include multiple cells. Each cell can include a rectangular area corresponding to an associated area in real space. For example, as shown in FIG. 17, the 3D map 1702 can include multiple cells. The center of each cell can be represented with a dot 1706. In some examples, each cell in the 3D map can associated with parameters associated with the cell's area in real space. For example, a parameter can include the height of the material (e.g., the height of the stubble), and the standard deviation of the height of the material, associated with the cell's area in real space. Boundaries 1704 of the 3D map can define the limits of the 3D map.

To generate the 3D map, the processing device 602 can map 3D data points to corresponding cells. For example, a 3D data point can be mapped to a particular cell 1708. In some examples, multiple 3D data points can be mapped to the same particular cell 1708.

In block 1606, the processing device 602 determines an upper 3D map and a lower 3D map. The lower 3D map can include a 3D map associated with features in the plane at or near ground level. The upper 3D map can include a 3D map associated with features in the plane along or near the top of the material (e.g., the top of the stubble). The processing device 602 can determine the upper 3D map and the lower 3D map based on the 3D map (e.g., generated in block 1604). The processing device 602 can determine the upper 3D map using a high percentile (e.g., 90%) of the height of the 3D data points with respect to ground. The processing 602 can determine the lower 3D map using a low percentile (e.g., 10%) of the height of the 3D data points with respect to ground.

Figure 18:
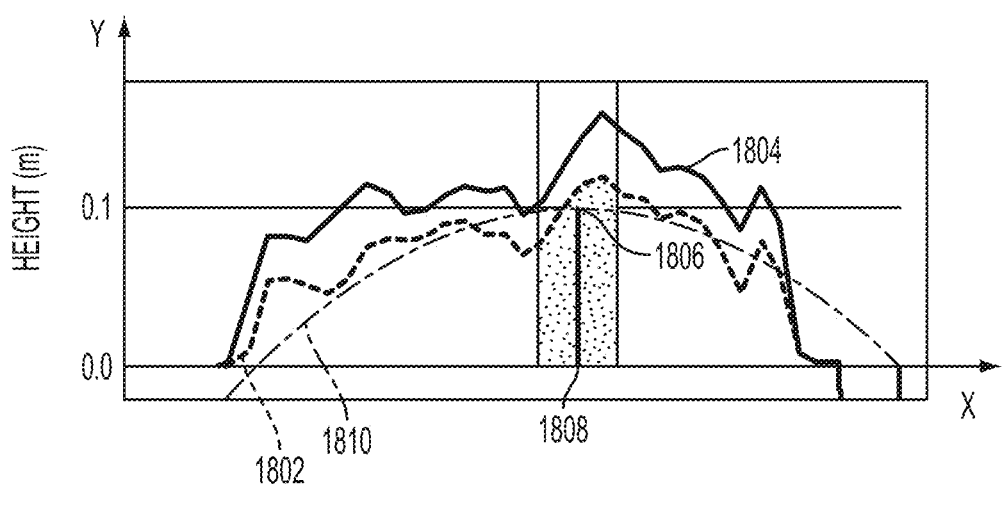
FIG. 18 is a graph for use in determining a row lateral position, row height, and material height according to one example.

In block 1608, the processing device 602 determines the row lateral position and row height (e.g., the lateral position and height of an area in real space associated with a row). The processing device 602 can determine the row position based on the lower 3D map. The processing device 602 can fit a model (e.g., a parabola) to the lower 3D map. For example, as shown in FIG. 18, the processing device 602 can fit a parabola 1810 to the lower 3D map 1802. The processing device 602 can determine the row's lateral position based on the location of the vertex 1808 of the parabola 1810 along the x-axis. In some examples, if the 3D sensor 202 is positioned in the lateral middle of the wheels (or tracks) of the harvester, the center of the x-axis can represent the lateral middle between the wheels (or tracks) of the harvester.

In some examples, the processing device 602 can determine the row height 1806 based on the vertex 1808 of the parabola 1810. For example, the processing device 602 can determine the row height 1806 based on the height of the vertex 1808 (e.g., 0.1 m) of the parabola.

In block 1610, the processing device 602 determines the height of the material. The processing device 602 can determine the height of the material based on the upper 3D map. For example, as shown in FIG. 18, the processing device 602 can generate the upper 3D map 1804. To determine the height of the material, the processing device 602 can subtract the height of the lower 3D map 1802 from the height of the upper 3D map 1804 at the vertex 1808 (e.g., 1.5 m). The difference between the height of the lower 3D map 1802 and the height of the upper 3D map 1804 at the vertex 1808 can be the height of the material.

In block 1612, the processing device 602 determines a new base cutter height (or orientation). The processing device 602 can determine the new base cutter height based on the determined material height (e.g., from block 1610), the current base cutter height setting, and user input data. For example, a user may input a desired material height into the computing device 612 (e.g., via a keyboard or touch screen display). The processing device 602 can determine the new base cutter height (or orientation) based on the difference between the desired material height and the determined material height. In some examples, the processing device 602 can use proportions, hysteresis, or other algorithms to generate a new base cutter height. For example, the processing device 602 can determine the new base cutter height as a proportion of the difference between the desired material height and the determined material height.

In some examples, the processing device 602 can determine a new base cutter height based on a calibration factor. For example, a user can manipulate the base cutter height until the material cut by the harvester reaches a desired height. The user can cause the processing device 602 to determine the height of the material (e.g., using the method described in blocks 1602-1610) and store the height of the material. This height can be used as a calibration factor. The processing device 602 can compare the height of material cut by the harvester thereafter to the calibration factor. The processing device 602 can determine the new base cutter height based on the difference between the height of the material and the calibration factor.

In some examples, upon determining a new base cutter height, the processing device 602 can cause the height of the base cutter to change to the new base cutter height. In this manner, the base cutter height control system can function as a feedback loop.

In block 1614, the processing device 602 can determine the number of fallen (e.g., cut) pieces of material, the length of the fallen pieces of material, and the number of roots of the material based on data from the 3D sensor 202. For example, the processing device 602 can extract features from the data. The processing device 602 can extract features from the data by filtering, determining texture information associated with, and determining the 2D and 3D edges associated with the data. The processing device 602 can also determine the entropy, frequency, and first order and higher order derivatives associated with the data. The processing device 602 classify (e.g., by applying a classifier or regressor to) the features to detect and determine the (i) number of fallen pieces of material, (ii) the length of the fallen pieces of material, and (iii) the number of visible roots of the material.

In some examples, the processing device 602 can estimate the damage resulting from a base cutter height that is too low (e.g., with relation to a desired or optimal base cutter height). If the base cutter height is too low, the base cutter can penetrate the row of material and extract or damage roots of the material. The processing device 602 can estimate the damage based on one or more of the number of fallen pieces of material, the length of the fallen pieces of material, and the number of visible roots of the material.

Figure 19:
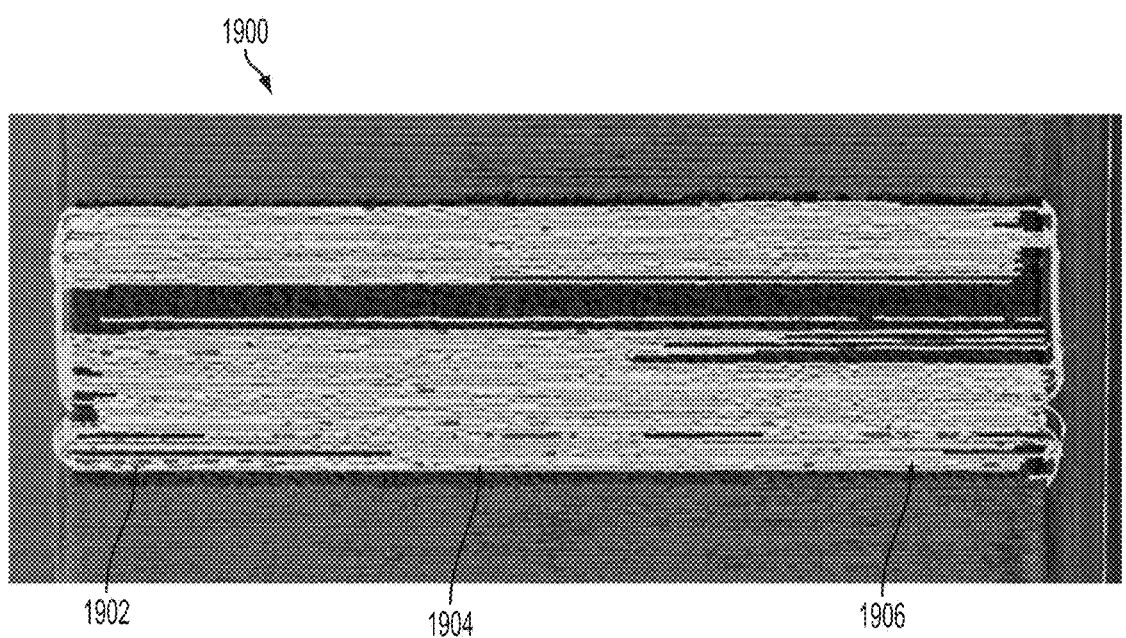
FIG. 19 is an example of a geographic map output by a base cutter height control system according to one example.

FIG. 19 is an example of a geographic map 1900 output by a base cutter height control system according to one example. In some examples, the geographic map 1900 can be presented through a user interface that is output on a display. This can facilitate data collection and operational feedback.

The geographic map 1900 can include different colored regions 1902, 1904, 1906. In some examples, each of the different colored regions 1902, 1904, 1906 on the map can be associated with different a material height. For example, colored region 1902 can be associated with geographic areas with high material. Colored region 1904 can be associated with geographic areas with low material. Colored region 1906 can be associated with geographic areas with medium-height material. In other examples, each of the different colored regions 1902, 1904, 1906 on the map can be associated with the number of fallen pieces material, the length of the fallen pieces of material, or the number of roots of the material. For example, colored region 1902 can be associated with geographic areas with a high number of fallen pieces of material. Colored region 1904 can be associated with geographic areas with a low number fallen pieces of fallen material. Colored region 1906 can be associated with geographic areas with medium number of pieces of fallen material.

The base cutter height control system can generate the colored regions 1902, 1904, 1906 based on (i) a material height, a number of fallen pieces of material, a length of a fallen piece of material, or a number of roots of the material; and (ii) data from one or more harvester sensors (e.g., harvester sensors 614 of FIG. 6). For example, upon the base cutter height control system determining the material height for a particular location, the base cutter height control system can receive GPS data (e.g., a latitude and longitude) associated with that particular location. The base cutter height control system can locate the GPS location on the geographic map 1900 and update the color associated with the GPS location based on the material height. As another example, upon the base cutter height control system determining the number of fallen pieces of material for a particular location, the base cutter height control system can receive GPS data (e.g., a latitude and longitude) associated with that particular location. The base cutter height control system can locate the GPS location on the geographic map 1900 and update the color associated with the GPS location based on the number of fallen pieces of material.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a stereo-camera system configured to detect an area of an elevator on a harvester and to transmit images associated with the area, the elevator having an elevator back plate with an irregular pattern of apertures configured to reduce volume determination errors;
a processing device in communication with the stereo-camera system; and
a memory device in which instructions executable by the processing device are stored for causing the processing device to:
receive the images;
generate a three-dimensional (3D) profile of the area at least in part by analyzing the images using triangulation, the 3D profile including a grid of squares, each square in the grid of squares having a predefined area and a corresponding height relative to a plane of the elevator;
filtering out, from the 3D profile, data points corresponding to a paddle on the elevator to produce a filtered 3D profile; and
determine a volume of a material on the elevator based on the filtered 3D profile.

2. The system of claim 1, further comprising a sensor configured to detect a parameter of the harvester and transmit a signal associated with the parameter to the processing device, wherein the memory device further comprises instructions executable by the processing device for causing the processing device to:
receive the signal; and
generate a three-dimensional (3D) map based on the signal;
determine the volume of the material based on the 3D map; and
determine a yield of the material based on the volume of the material and the signal.

3. The system of claim 2, wherein the parameter comprises a GPS location, speed, direction, or crop processing engagement.

4. The system of claim 2, wherein the memory device further comprises instructions executable by the processing device for causing the processing device to:
generate a corrected GPS location by modifying a GPS location associated with the yield by a distance;
spatially filter the yield to generate a filtered yield value; and
generate a yield map based on the filtered yield value and the corrected GPS location.

5. The system of claim 1, wherein the memory device further comprises instructions executable by the processing device for causing the processing device to:
determine a composition of the material by analyzing a color and a texture of the material in the images, wherein the composition comprises a first percentage of the material that is attributable to a target material and a second percentage of the material that is attributable to an extraneous material; and
apply a scaling factor to the volume of the material based on the composition to determine a calibrated volume.

6. The system of claim 5, wherein the memory device further comprises instructions executable by the processing device for causing the processing device to:
change a speed of a fan associated with a primary extractor or a secondary extractor based on the composition.

7. The system of claim 5, wherein the memory device further comprises instructions executable by the processing device for causing the processing device to:
operate the stereo-camera system when the elevator does not include the material;
receive the images from the stereo-camera system;
determine a baseline volume based on the images; and
modify the calibrated volume based on the baseline volume.

8. The system of claim 1, further comprising a lighting system that includes a sensor configured to detect an amount of ambient light and at least one light positioned to illuminate the area of the elevator, wherein the memory device further includes instructions that are executable by the processing device for causing the processing device to operate the at least one light to illuminate the area of the elevator based on the detected amount of ambient light.

9. The system of claim 5, wherein the memory device further includes instructions that are executable by the processing device for causing the processing device to determine the composition of the material by:
determining that a first portion of an image corresponds to the elevator and a second portion of the image corresponds to the material based on a first color of the elevator being different from a second color of the material.

10. The system of claim 1, further comprising a paddle sensor configured to detect a position of a paddle on the elevator and transmit a signal to the processing device, wherein the memory device further comprises instructions executable by the processing device for causing the processing device to:
receive the signal;
determine a speed of the elevator based on the signal; and
operate the stereo-camera system based on the signal.

11. The system of claim 1, wherein the memory device further comprises instructions executable by the processing device for causing the processing device to:
determine a position of a paddle on the elevator based on the images from the stereo-camera system by identifying the paddle in an image from the stereo-camera system; and
determine a speed of the elevator based on the position of the paddle.

12. The system of claim 1, wherein triangulation involves correlating a first set of pixels in a first image from a first camera in the stereo-camera system to a second set of pixels in a second image from a second camera in the stereo-camera system.

13. A method comprising:
receiving, by a processing device, images from a stereo-camera system, the images being of an area of an elevator of a harvester, the elevator having an elevator back plate with an irregular pattern of apertures configured to reduce volume determination errors;
generating, by the processing device, a three-dimensional (3D) profile of the area of the elevator at least in part by analyzing the images using triangulation, the 3D profile including a grid of squares, each square in the grid of squares having a predefined area and a corresponding height relative to a plane of the elevator;
filtering out, by the processing device and from the 3D profile, data points corresponding to a paddle on the elevator to produce a filtered 3D profile; and
determining, by the processing device, a volume of a material on the elevator based on the filtered 3D profile.

14. The method of claim 13, further comprising:
calibrating the 3D profile based on calibration data, wherein the calibration data determined using other images from the stereo-camera system generated prior to the material being positioned in the elevator, and wherein the calibration data accounts for (i) a position of a back plate of the elevator, (ii) a deformation in the back plate of the elevator, and (iii) a characteristic of a paddle on the elevator.

15. The method of claim 13, further comprising:
determining a speed of the elevator; and
multiplying the speed of the elevator by the volume to determine a total volume of the material on the elevator.

16. The method of claim 13, further comprising:
determining a composition of the volume of the material on the elevator by:
dividing the images into segmented regions based on a visual characteristic of the material in the elevator;
generating corrected segmented-regions by correcting the segmented regions for at least one of illumination, scale, or perspective;
performing feature extraction on the corrected segmented-regions to determine one or more features in the corrected segmented-regions; and
classifying the one or more features as trash or a target material to determine the composition of the material on the elevator; and
modifying the volume of the material on the elevator based on the composition.

17. The method of claim 16, further comprising changing a speed of a fan associated with a primary extractor or a secondary extractor based on the composition of the volume of the material.

18. The method of claim 13, further comprising:
receiving, from a sensor, a signal associated with a parameter of the harvester; and
generating a yield map based on the volume of the material and the parameter.

19. The method of claim 18, wherein generating the yield map further comprises:
generating a yield based on the volume of the material;
generating a corrected GPS location by modifying the parameter by a distance;
spatially filtering the yield to generate a filtered yield value; and
generating the yield map based on the filtered yield value and the corrected GPS location.

20. A harvester comprising:
an elevator having an elevator back plate with an irregular pattern of apertures configured to reduce volume determination errors; and
a stereo-camera system coupled to the harvester and configured to detect an area associated with the elevator and transmit images associated with the area;
wherein the harvester is configured for:
generating a three-dimensional (3D) profile of the area of the elevator at least in part by analyzing the images using triangulation;
adjusting a coordinate plane of the 3D profile to align with a plane of the elevator such that the coordinate plane of the 3D profile includes (i) a first axis that is oriented along a direction of paddle movement on the elevator, (ii) a second axis that is oriented from the elevator toward the stereo-camera system, and (iii) a third axis that is orthogonal to the first axis and the second axis;
determining a composition of a material by analyzing the 3D profile of the area of the elevator; and
determining a volume of a crop included in the material based on the composition of the material.

21. The harvester of claim 20, further comprising a paddle sensor configured to detect a position of a paddle on the elevator and transmit a paddle sensor signal usable for:
determining a speed of the elevator; and
operating the stereo-camera system.

22. The harvester of claim 20, further comprising a lighting system that includes:
a sensor configured to detect an amount of ambient light; and
a plurality of lights positioned to illuminate the area of the elevator and separate from the stereo-camera system, wherein the harvester is configured to operate the plurality of lights to illuminate the area of the elevator based on the amount of ambient light detected using the sensor.

23. The harvester of claim 20, further comprising a sensor configured to detect a parameter of the harvester and transmit a sensor signal associated with the parameter that is usable for:
determining a yield of the crop based on the volume of the material and the sensor signal.

24. The harvester of claim 23, wherein the yield is usable for generating a yield map.

25. The harvester of claim 20, wherein the composition of the material is usable for changing a speed of a fan associated with a primary extractor or a secondary extractor.

26. A system comprising:
a harvester comprising:
a base cutter; and
a stereo-camera system positioned underneath the harvester, the stereo-camera system being configured to capture an area that is underneath or behind the harvester and to transmit images of the area;
a processing device in communication with the stereo-camera system; and
a memory device on which instructions executable by the processing device are stored for causing the processing device to:
generate a three-dimensional (3D) profile of the area by analyzing the images using a stereo-vision algorithm; and
modify a height of the base cutter based on the 3D profile.

27. The system of claim 26, wherein the memory device further comprises instructions executable by the processing device for causing the processing device to:
determine a lateral position of a row of a stubble or a height of the stubble based on the 3D profile of the area; and
modify the height of the base cutter based on the lateral position of the row of the stubble or the first height of the stubble.

28. The system of claim 26, further comprising a debris barrier configured to protect the stereo-camera system from damage or debris.

29. The system of claim 26, further comprising a lighting system that includes:

a sensor configured to detect an amount of ambient light; and at least one light positioned underneath the harvester for illuminating the area.

30. The system of claim 26, wherein the memory device further comprises instructions executable by the processing device for causing the processing device to:

receive the images from the stereo-camera system;

determine a calibration factor by analyzing the images; and determine the height of the base cutter based on the calibration factor.

31. The system of claim 26, further comprising a sensor configured to detect a location of the harvester and transmit a sensor signal associated with the location, and wherein the memory device further comprises instructions executable by the processing device for causing the processing device to:

analyze the images to determine information about a material depicted in the images, the information include a height of the material, a number of fallen pieces of the material, a length of a fallen piece of the material, or a number of roots of the material; and generate a geographic map based on the location of the harvester and the information.

32. A method comprising:

receiving, by a processing device, images from a stereo-camera system positioned underneath a harvester comprising a base cutter, the images depicting an area that is underneath or behind the harvester;

generating, by the processing device, a three-dimensional (3D) profile of the area by analyzing the images using a stereo-vision algorithm; and modifying, by the processing device, a height of the base cutter based on the 3D profile.

33. The method of claim 32, further comprising:

filtering the images from the stereo-camera system to generate filtered images;

determining a lateral position of a row of material depicted in the images or a height of the row of material depicted in the images using the filtered images.

34. The method of claim 33, further comprising:

calibrating the height of the row of material based on calibration data, wherein the calibration data determined using (i) other images from the stereo-camera system and (ii) a user input.

35. The method of claim 33, further comprising:

receiving, from a sensor, a signal indicating a location of the harvester; and generating a geographic map based on the location of the harvester and the height of the row of material.

36. The method of claim 35, further comprising:

analyzing the images to determine information about a material depicted in the images, the information including a number of fallen pieces of the material, a length of a fallen piece of the material, or a number of roots of the material; and generating the geographic map based on the location of the harvester and the information.

37. The method of claim 33, wherein filtering the images comprises filtering the images to reduce an effect of airborne debris on the 3D profile.

* * * * *